United States Patent [19]

Smith et al.

[11] Patent Number: 5,724,529
[45] Date of Patent: Mar. 3, 1998

[54] COMPUTER SYSTEM WITH MULTIPLE PC CARD CONTROLLERS AND A METHOD OF CONTROLLING I/O TRANSFERS IN THE SYSTEM

[75] Inventors: Stephen A. Smith, Palo Alto; Jafar Naji, Glenbare, both of Calif.

[73] Assignee: Cirrus Logic, Inc., Fremont, Calif.

[21] Appl. No.: 561,777

[22] Filed: Nov. 22, 1995

[51] Int. Cl.[6] ................................................ G06F 13/00
[52] U.S. Cl. .................... 395/309; 395/306; 395/281; 395/284; 395/822; 395/829; 395/651
[58] Field of Search ........................ 395/500, 850, 395/653, 829, 421, 309, 205, 306, 281, 284, 822, 651, 200

[56] References Cited

U.S. PATENT DOCUMENTS

| | | | |
|---|---|---|---|
| 4,954,949 | 9/1990 | Rubin | 395/200.01 |
| 5,038,320 | 8/1991 | Heath et al. | 395/830 |
| 5,111,423 | 5/1992 | Kopec, Jr. et al. | 395/500 |
| 5,237,690 | 8/1993 | Bealkowski et al. | 395/653 |
| 5,274,711 | 12/1993 | Hamilton et al. | 395/829 |
| 5,446,869 | 8/1995 | Padgett et al. | 395/500 |
| 5,507,002 | 4/1996 | Heil | 395/828 |
| 5,530,895 | 6/1996 | Enstrom | 395/421.02 |
| 5,555,510 | 9/1996 | Verseput et al. | 364/514 R |
| 5,572,688 | 11/1996 | Sytwu | 395/309 |
| 5,590,377 | 12/1996 | Smith | 395/842 |

*Primary Examiner*—Christopher B. Shin
*Attorney, Agent, or Firm*—David L. Stewart; J. P. Violette

[57] ABSTRACT

A method and arrangement for controlling input/output (I/O) operations in a computer system provides multiple PC card controllers but allows legacy software to be used. A PCI bus is coupled to a central processing unit, and an ISA bus is coupled to the PCI bus by a bridge. At least one PC card controller is coupled to the PCI bus and at least one other PC card controller is coupled to the ISA bus. Each PC card controller has at least one socket in which a device is connectable, each socket being separately addressable by the processor at an (I/O) address through the respect PC card controller. Each controller also has a socket pointer register, each socket pointer register being loadable with socket pointer information that uniquely identifies each socket of the controller among all of the sockets of the plurality of controllers in the computer system. Each controller also has an index register and a plurality of data registers, the index stored in the index register pointing to one of the data registers. The index registers of the PC card controllers are updated when the processor writes to an I/O address, without acknowledging the write on the PCI bus. This allows the writes to propagate through the system to lower levels, instead of being stopped by a subtractive decode device. To perform this, each PC card controller compares the socket pointer information with the updated index in the index register. When at least a portion of the socket pointer information matches at least a portion of the updated index, the PC card controller updates with write data the data register pointed to by the index register.

20 Claims, 2 Drawing Sheets

COMPUTER SYSTEM WITH MULTIPLE PC CARD CONTROLLERS AND A METHOD OF CONTROLLING I/O TRANSFERS IN THE SYSTEM

FIELD OF THE INVENTION

The present invention relates to the field of computer systems, and more particularly, to the addressing of devices coupled to a bus in a computer system.

BACKGROUND OF THE INVENTION

As technological advances in hardware continue, there remains behind a large body of software that is specifically designed for use with older hardware. This software is known as "legacy" software. The ability to use legacy software to interact with current hardware is extremely desirable as it greatly expands the possible applications of a computer system.

In many conventional systems, peripheral devices are coupled to a bus by hardwired connections with jumper pins. In order to address these devices, legacy software uses a two byte address in which there is an index. This index is an eight bit quantity that the legacy software writes to in order to set up which register in a host adapter is to be written to. The host adapter may have four independent sockets (or devices) that can be written to. Therefore, the value of two bits of the eight bit quantity determines which of the four sockets are being written to.

The address at which legacy software expects to write to devices is one of two fixed addresses, 03E0h or 03E2h. The index is set through 03E0h, and the information is provided through the next address, 03E1h, serving as the data port of a 16 bit port. For example, if device 01 is to have its power turned on, then two bits of the index at 03E0h will be set to 01, indicating that device 01 is selected. One of the bits at 03E1h will be set, indicating to device 01 to turn its power on. The addresses 03E0h and 03E1h provide access to four sockets, and addresses 03E2h and 03E3h provide access to an additional four sockets, for a total system I/O addressability of up to eight sockets.

The hardwired connections of devices to the bus in older systems allows only a specified device to respond when the two bits of the index correspond to that device. Legacy software expects this requirement to be fulfilled. However, in current bus technology, such as PCI bus technology, each device on the PCI bus is programmed as to where it should appear in an I/O map at the beginning of the boot operation when a computer is first turned on. The ability to reconfigure a computer system by moving the devices within an I/O map is a powerful concept, providing great flexibility to a system user or designer. Legacy software, however, is not able to take advantage of these advances since it expects each specific device to be specifically hardwired to the bus to respond to the two bits in the index.

Devices which have been hardwired to a bus (such as an ISA bus) as in prior systems, respond to the bus commands by first decoding the system address lines. If the address that is asserted on the bus circuitry matches a device's address, the device will latch the data or place the data onto the system data lines for the host processor (CPU) to read. Since there is no bus hierarchy in ISA bus based systems, all of the ISA devices see the address asserted by the initiator on the address lines at the same time.

In contrast to ISA bus based systems, in PCI bus based systems the I/O devices need to be 4 bytes apart in the address space. Furthermore, in PCI systems, there are typically more than one bus. For example, there may be a main PCI bus and a PCI to ISA bridge connected to the main PCI bus. Any ISA devices connected to the PCI to ISA bridge are therefore one level lower than the PCI devices connected to the main PCI bus. To comply with the PCI specification, PCI devices will respond with a DEVSEL# signal within four PCI bus cycles after the CPU issues an address on the address lines. The assertion of DEVSEL# indicates that the PCI device has claimed the cycle. If no PCI device on the bus responds within the four cycles, the PCI to ISA bridge can then claim the cycle, if it is programmed to respond to do negative decoding. If any one of the PCI devices responded to the issuance of the address by asserting DEVSEL#, then the ISA devices connected to the PCI to ISA bridge will not see the issued address.

If a PCI device in a system is programmed for I/O backward compatibility mode with legacy software so that it responds to I/O address 03E0h (with two sockets, 0 and 1), a problem exists if there is an ISA device also in the system (with sockets 2 and 3). This problem is that the ISA device will not be aware of the issuance of the address 03E0h due to the claiming of this address in each instance by the PCI device.

SUMMARY OF THE INVENTION

There is a need for a method and arrangement for allowing legacy software to operate with a computer system having devices coupled to a PCI bus and devices coupled to a PCI to ISA bridge, in which the devices coupled to the PCI to ISA bridge will see addresses intended for them.

This and other needs are met by the present invention which provides a computer system comprising a processor, a first bus coupled to the processor, and a second bus coupled to the first bus by a bridge. At least one controller is coupled to the first bus and at least one controller is coupled to the second bus. Each controller has at least one socket in which a device is connectable, each socket being separately addressable at an input/output (I/O) address through the controller by the processor. Each controller also has a socket pointer register, an index register, and a plurality of data registers. Each socket pointer register is loadable with socket pointer information that uniquely identifies the at least one socket among all of the sockets of the plurality of controllers. The index stored in the index register points to one of the data registers. Each controller also includes means for updating the index register when the processor writes to an I/O address, without acknowledging the write on the first bus, and means for recognizing addressing of the at least one socket of the controller by the processor. The controllers further include means for comparing the socket pointer information with the updated index in the index register, and when at least a portion of the socket pointer information matches at least a portion of the updated index, updating with write data the data register pointed to by the index register.

Another aspect of the present invention provides a PC card controller for controlling at least one card coupled to the PC card controller, comprising at least one socket for receiving the at least one card and providing controllable connectivity of the card to a system. The PC card controller also has a socket pointer register that stores socket pointer information uniquely identifying the at least one socket from any other socket in a system. A plurality of data registers are provided that store data. An index register stores an index that points to one of the plurality of data registers. The PC card controller includes means for writing an index into the index register without acknowledging the writing of the index.

A still further aspect of the present invention provides a method of controlling input/output (I/O) transfers of data in a computer system having multiple PC card controllers that each has at least one socket into which a card is insertable. The method comprises the steps of programming the PC card controllers with individually addressable socket numbers, such that each socket in the system is uniquely addressable. An index is written into the index registers of a plurality of the PC card controllers without acknowledgement of the writing of the index into the index registers, the index being addressed to a specific one of the sockets.

Writes are able to propagate down to lower system levels than was possible in prior arrangements, since the writes to the index registers are not acknowledged. This allows the use of multiple PC card controllers in a system having a PCI bus but that is still able to run legacy software.

The foregoing and other features, aspects and advantages of the present invention will become more apparent from the following detailed description of the present invention when taken in conjunction with the accompanying drawings.

DESCRIPTION OF THE PREFERRED EMBODIMENTS

Figure 1:
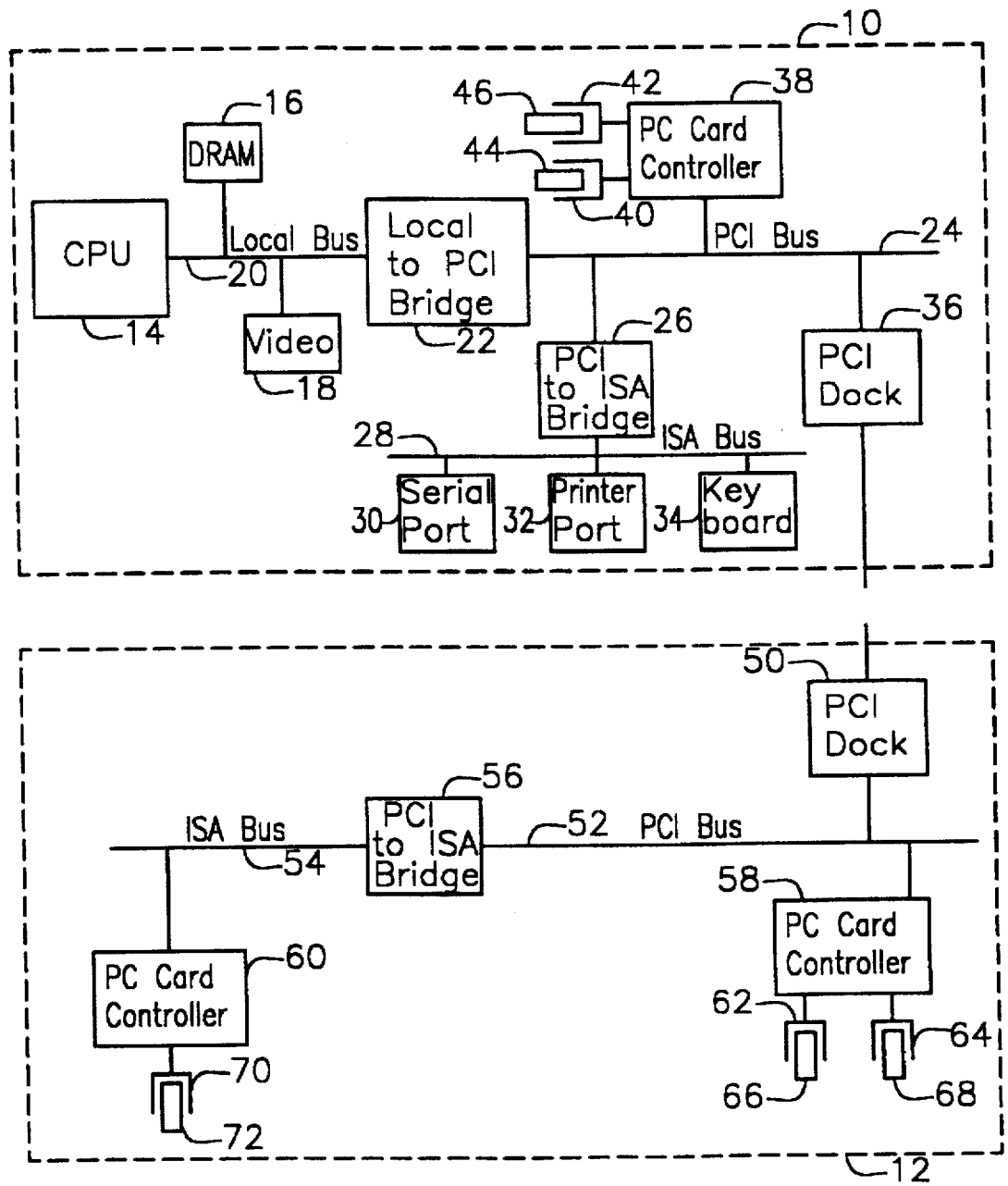
FIG. 1 is a block diagram of a computer system constructed in accordance with an embodiment of the present invention.

FIG. 1 is a block diagram of an exemplary computer system in which the present invention can be used. This system comprises a "notebook" computer 10 and a docking station 12. Although the system is described in the following as having a notebook computer and a docking station, this is for illustrative purposes only, as the invention finds utility in other types of computer systems, such as desktop systems.

The computer 10 has a central processing unit (CPU) 14 coupled to a local bus 20. Also shown coupled to the local bus 20 are a dynamic random access memory (DRAM) 16 and a video controller (video) 18. The local bus 20, and the devices thereon, are coupled to a peripheral component interconnect (PCI) bus 24 through a local to PCI bridge 22. The bridge 22 performs translations between local bus cycles and PCI bus cycles.

The computer 10 has another bus, an industry standard architecture (ISA) bus 28, to which a number of devices are connected. These devices include a serial port 30, a printer 32 and a keyboard 34, for example. The PCI bus 24 is coupled to the ISA bus 28 by a PCI to ISA bridge 26, which translates between PCI and ISA bus cycles. A PC card controller 38 is coupled to the PCI bus 24 and has two sockets 40, 42, into which PC cards 44, 46 can be inserted.

The computer 10 may be coupled to the docking station 12 through docking ports 36 (in the computer) and 50 (in the docking station). The docking station 12 in the embodiment of FIG. 1 has a PCI bus 52 to which another PC card controller 58 is coupled. The PC card controller 58 has two sockets 62, 64 in which PC cards 66, 68 can be connected. The PC card controllers 38 and 58 are PCI to PCMCIA card controllers, for example.

The PCI bus 52 is coupled to an ISA bus 54 through a PCI to ISA bridge 56. The ISA bus 54 has a PC card controller 60 coupled to it, the PC card controller 60 having only a single socket 70, for example, in which a PC card 72 can be connected. This PC card controller 60 is an ISA to PCMCIA card controller, for example. In the illustrated embodiment of the computer system, the PCI bus 52 can be considered to be a secondary PCI bus, while the PCI bus 24 is a primary PCI bus, since the PCI bus 24 is closer to the CPU 14. Similarly, the ISA bus 28 can be considered a primary ISA bus and the ISA bus 54 a secondary ISA bus.

Figure 2:
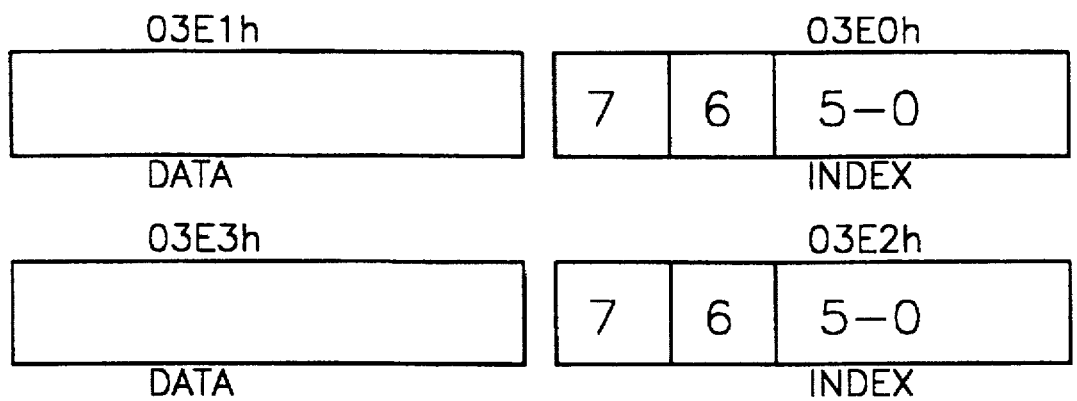
FIG. 2 is a diagram of addresses used by software to address devices in the system of FIG. 1.

FIG. 2 depicts two sixteen bit addresses at which legacy software writes to sockets (i.e., devices). The lower eight bits (03E2h and 03E2h, respectively) address the index register of the devices. Bits 6 and 7 of the indexes are used to identify one of four sockets. Since four different sockets can be identified by the two bits in each of the two indexes, a total of eight different sockets can be identified. Devices which have been hardwired to a bus (such as an ISA bus) as in prior systems, respond to the bus commands by first decoding the system address lines. If the address that is asserted on the bus circuitry matches a device's address, the device will latch the data or place the data onto the system data lines for the host processor (CPU) to read. Since there is no bus hierarchy in ISA bus based systems, all of the ISA devices see the address asserted by the initiator on the address lines at the same time.

In contrast to ISA bus based systems, in PCI bus based systems the I/O devices need to be 4 bytes apart in the address space. Legacy software, which only writes to the fixed addresses 03E2h and 03E2h, therefore could not be used in PCI bus based systems. To overcome this limitation, the present invention provides a configuration register in the PC card controllers coupled to the different buses. This configuration register is referred to as the "socket pointer register", and is programmed with the socket numbers of the devices when the computer system is booted.

Figure 3:
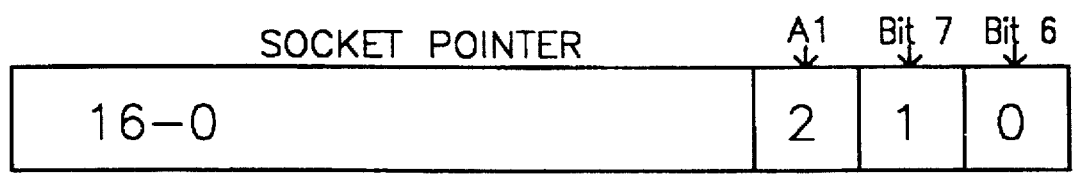
FIG. 3 is a diagram of a socket pointer register of the present invention.

An exemplary socket pointer register is depicted in FIG. 3, with only the three least significant bits illustrated. The remaining bits of the socket pointer register (which may be 32 bits, for example) may be used for other configuration information not relevant to the present invention. Of the three bits, bit 0 of the socket pointer register corresponds to bit 6 of address 03E2h and of address 03E2h. Bit 1 of the socket pointer register corresponds to bit 7 of addresses 03E2h and 03E2h. Bit 2 of the socket pointer register indicates which word (03E2h or 03E2h) in the 32 bit address contains the bits 6 and 7 that should be examined. The address line A1 of the 32 bit address forms the value for bit 2. It is this address line that differentiates 03E2h from 03E2h.

Each controller 38, 58, 60 can have up to two sockets in the exemplary embodiment. However, the socket number register must be programmed sequentially for each socket of the controller in preferred embodiments of the present invention. For example, if the socket number register for the first socket of a controller is programmed as 00h, then the socket number register for the second socket must be programmed with 01h.

The use of three bits to distinguish devices from one another permits up to eight devices in the system to be addressed. As an example, referring to FIG. 1, assume that CPU 14 desires to write to PC card 46. The PC card controller 38 (a PCI to PCMCIA card controller, for example) contains a socket register whose bits 2:0 are programmed (upon booting of the system, for example) with the values 1,0, and 1. Thus, when the CPU 14 is to write to the PC card 46, it issues on the address lines the address 03E2h, with bit 7 of the accompanying data (corresponding to the index) set to 0 and bit 6 set to 1. The address line A 1 therefore has a value of 1. The index that is written into the index register for the device (PC card 46) is an 8-bit index, with bits 5:0 pointing to the data register in which the data that will be written by the CPU 14 will be stored.

All of the PC card controllers 38, 58 and 60 that have a value of bit 2 of their socket number register that matches address line A1 will update the index registers for the devices coupled to their sockets. The PC card controllers 38 and 58 will not assert the DEVSEL# signal during this phase, this signal being asserted by a device on a PCI bus to claim a cycle. Hence, the same index will be written in the index registers of multiple devices.

Once the index has been written, a write to address 03E1h or 03E3h causes one of the PC card controllers 38, 58 and 60 to update the data register pointed to by the index register, if bit 2 of the socket number register is equal to PCI address line A1 and bits 7:6 match bits 1:0 of the socket number register. Again, the PC card controllers 38 and 58 will not assert the DEVSEL# signal during this phase.

Read operations by the CPU 14 are performed in a similar manner to write operations. For reads from address 03E2h or 03E2h, when the CPU 14 issues an address, the PC card controllers 38, 58 and 60 will respond to the read cycle only if bit 2 of their individual socket number register matches PCI address line A1 and bits 7:6 of their index register matches bits 1:0 of the socket number register. Unlike the write operation however, the PC card controllers 38 and 58 coupled to a PCI bus (24 and 52 respectively) will assert the DEVSEL# signal to claim this cycle if the above conditions are met.

For reads from address 03E1h or 03E3h, the PC card controllers 38, 58 and 60 will respond to the read cycle only if bit 2 of their individual socket number register matches the PCI address line A1 and bits 7:6 of their index register matches bits 1:0 of their socket number register. The PC card controllers 38 and 58 will assert DEVSEL# to claim this cycle if the above conditions are met.

By following the above described procedures for performing writes and reads to the multiple controllers in the system, a PC card such as an ISA to PCMCIA controller 60 connected to a PCI to ISA bridge 56, will always see the address intended for it. As shown in the above exemplary embodiment, both a PCI to PCMCIA controller (such as 38 and 58) may coexist in a system with an ISA to PCMCIA controller (such as 60), as long as the PCI to PCMCIA controller is connected to a bridge above the PCI to ISA bridge (such as 56). The reason for this requirement is that most PCI to ISA bridges are programmed for positive address decoding and do not pass the addresses to the lower bridges.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A computer system comprising:
a processor;
a first bus coupled to the processor, and a second bus coupled to the first bus by a bridge; and
at least one controller coupled to the first bus and at least one controller coupled to the second bus, each said controller coupled to the first bus having:

at least one socket in which a device is connectable, each socket being separately addressable at an input/output (I/O) address through the controller by the processor, a socket pointer register, each socket pointer register being loadable with socket pointer information that uniquely identifies the at least one socket among all of the sockets of the plurality of controllers, an index register and at least one data register pointed to by an index stored in the index register, in which each said controller coupled to the first bus updates the index register when the processor writes to an I/O address, without acknowledging the write on the first bus, and recognizes addressing of the at least one socket of the controller by the processor, by comparing the socket pointer information with the updated index in the index register, and when at least a portion of the socket pointer information matches at least a portion of the updated index, updating with write data the data register pointed to by the index register.

2. The system of claim 1, wherein each said controller recognizes the addressing of the socket by comparing at least one specific address line of the bus to at least one specific bit of the socket pointer information, the controller responding to a read cycle on the first bus when the comparing indicates at least a portion of the socket pointer information matches at least a portion of the updated index and when the at least one specific bit of the socket pointer information matches the at least one specific address line of the first bus.

3. The system of claim 2, wherein responding to a read cycle includes acknowledging the read cycle on the first bus when comparing indicates at least a portion of the socket pointer information matches at least a portion of the updated index and when the at least one specific bit of the socket pointer information matches the at least one specific address line of the first bus.

4. The system of claim 3, wherein the first bus is a peripheral component interconnect (PCI) bus.

5. The system of claim 4, further comprising a second bus and a bridge coupled between the first and second busses, wherein the second bus is an industry standard architecture (ISA) bus.

6. The system of claim 5, wherein the at least one controller coupled to the first bus is a PCI to PCMCIA controller, and the at least one controller coupled to the second bus is a ISA to PCMCIA controller.

7. The system of claim 6, wherein the first bus is coupled between the processor and the second bus.

8. The system of claim 7, wherein the total number of sockets in the system is less than or equal to eight, the number of bits in the portion of the socket pointer register is two bits, and the number of specific bits of the socket pointer information that are compared to the at least one specific bit of the address line of the first bus is one bit.

9. The system of claim 8, wherein the at least one controller coupled to the first bus has two sockets.

10. The system of claim 9, wherein the at least one controller coupled to the second bus has two sockets.

11. The system of claim 10, wherein the bridge coupled between the first and second busses is a PCI to ISA bridge programmed for positive address decoding.

12. The system of claim 11, wherein the at least one controller coupled to the second bus is programmed for subtractive decoding.

13. A PC card controller for controlling at least one card coupled to the PC card controller, comprising:

at least one socket for receiving the at least one card and providing controllable connectivity of the card to a system;

a socket pointer register that stores socket pointer information uniquely identifying the at least one socket from any other socket in a system;

a plurality of data registers that store data; and an index register that stores an index that points to one of the plurality of data registers; in which the PC card controller is configured to write an index into the index register without acknowledging the writing of the index.

14. The PC card controller of claim 13, further configured to recognize addressing of the at least one socket, by comparing socket pointer information in the socket pointer register with the index in the index register, and when at least a portion of the socket pointer information matches at least a portion of the index, updating with write data the data register pointed to by the index register.

15. The PC card controller of claim 14, further configured to recognize the addressing of the at least one socket by comparing at least one specific address line of a bus to at least one specific bit of the socket pointer information, the controller responding to a read cycle when the comparing indicates at least a portion of the socket pointer information matches at least a portion of the updated index and when the at least one specific bit of the socket pointer information matches the at least one specific address line of the bus.

16. The PC card controller of claim 15, configured to respond to a read cycle by acknowledging the read cycle when the comparing indicates at least a portion of the socket pointer information matches at least a portion of the index and when the at least one specific bit of the socket pointer information matches the at least one specific address line.

17. A method of controlling input/output (I/O) transfers of data in a computer system having multiple PC card controllers that each has at least one socket into which a card is insertable, the method comprising the steps of:

programming the PC card controllers with individually addressable socket numbers, such that each socket in the system is uniquely addressable; and writing an index into index registers of a plurality of the PC card controllers without acknowledgement of the writing of the index into the index registers, the index being addressed to a specific one of the sockets.

18. The method of claim 17, wherein the step of programming includes storing socket pointer information in a socket pointer register in each PC card controller, and wherein the step of writing includes recognizing addressing of the socket by comparing the socket pointer information with the index in the index register, and when at least a portion of the socket pointer information matches at least a portion of the index, updating with write data a data register pointed to by the index register.

19. The method of claim 18, further comprising comparing at least one specific address line of a bus to which the PC card controller is connected with at least one specific bit of the socket pointer information, and responding to a read cycle on the bus when the comparison comparing indicates at least a portion of the socket pointer information matches at least a portion of the index and when the at least one specific bit of the socket pointer information matches the at least one specific address line of the bus.

20. The method of claim 19, further comprising responding to a read cycle by acknowledging the read cycle on the first bus when the comparison indicates at least a portion of the socket pointer information matches at least a portion of the index and when the at least one specific bit of the socket pointer information matches the at least one specific address line of the bus.

* * * * *